Nov. 9, 1965  C. A. SHELD  3,216,958
COLORING THERMOSET RESINS WITH METALLO-ORGANIC COMPOUNDS
Filed May 31, 1960  2 Sheets-Sheet 1

VII BEFORE POLYMERIZATION
VIIa AFTER POLYMERIZATION

INVENTOR.
CLARENCE A. SHELD
BY
ATTORNEYS

Nov. 9, 1965  C. A. SHELD  3,216,958
COLORING THERMOSET RESINS WITH METALLO-ORGANIC COMPOUNDS
Filed May 31, 1960  2 Sheets-Sheet 2

INVENTOR.
CLARENCE A. SHELD
BY Hoffman Stone
Frank C. Parker
ATTORNEYS

United States Patent Office 3,216,958
Patented Nov. 9, 1965

3,216,958
COLORING THERMOSET RESINS WITH METALLO-
ORGANIC COMPOUNDS
Clarence A. Sheld, Irondequoit, N.Y., assignor to Bausch
& Lomb Incorporated, a corporation of New York
Filed May 31, 1960, Ser. No. 32,723
16 Claims. (Cl. 260—23.5)

This invention relates to an improved method of coloring plastics, and more particularly, to an improved method of coloring thermosetting polymerizable materials by incorporating a coloring agent within the body of the material before it is fully polymerized, whereby the color is dispersed throughout the material.

The practice of the invention is thought to have particular commercial application at present to clear, transparent plastics, and especially to transparent thermosetting plastics of the difficultly polymerizable type, which cannot be satisfactorily dyed internally with ordinary organic dyes such as, for example, those plastics that require the use of relatively strongly oxidizing catalysts, or initiators of the peroxide or peroxyester groups. Previous efforts to color such plastics internally have usually produced only a yellowish or amber color, probably resulting from oxidation of the dye, and, accordingly, the usual prior practice has been to surface dye thermosetting plastics after they have been polymerized. Surface dying is unsatisfactory not only from the viewpoint of wear and damage from scratching, but particularly because of the difficulty of controlling the dyeing operation. Relatively small variations in the degree of cure in the surface of the plastic body result in variations in dye penetration, and thereby affect the coloring produced by the dye. Uniformity of color from piece to piece is relatively difficult to achieve, and the operation requires a relatively high degree of operator skill.

Accordingly, one important object of the present invention is to improve methods of coloring thermosetting plastics.

Other objects are: to provide improved methods of coloring thermosetting plastics whereby color is distributed internally in the material; to provide improved colored plastic articles having a relatively high degree of color stability and resistance to fading; to provide improved optical elements such as filters and sunglasses made of thermosetting plastics and having any desired light transmitting characteristics; and, in general, to provide relatively simple and inexpensive methods of coloring plastic bodies capable of producing uniform coloration and not requiring a high degree of operator skill.

The foregoing and other objects and advantages of the invention will become apparent in the following detailed description of representative embodiments thereof, taken in conjunction with the drawing wherein.

Figure 1:
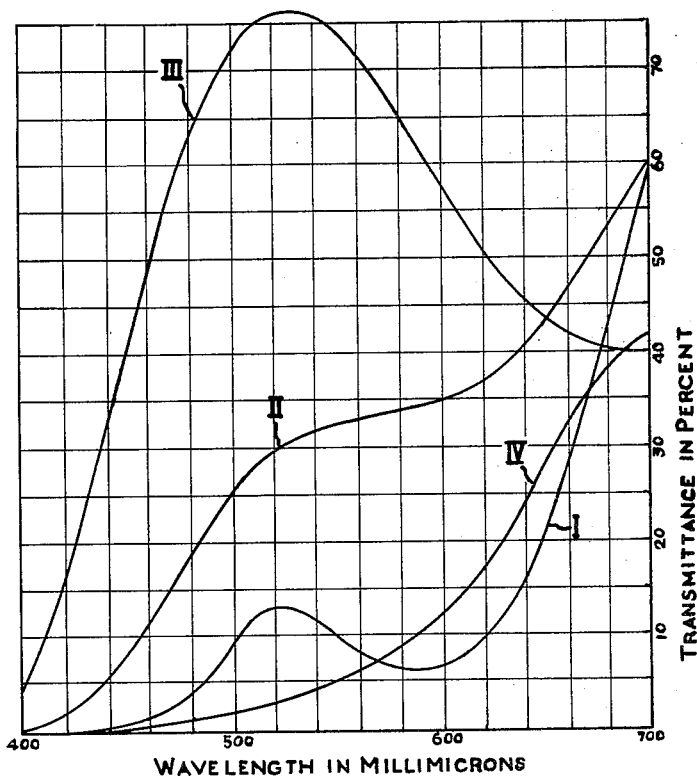
FIG. 1 is a chart illustrating the light transmission characteristics of four different optical elements made according to the present invention.

According to the present invention, it has now been found that a wide variety of colors can be introduced internally into thermosetting plastics by incorporating a relatively small proportion of an organic compound of one of the transition metals into the monomer or prepolymer mixture prior to final polymerization. The work from which the present invention stems had to do mainly with clear, transparent, thermosetting plastics of the type used for optical elements such as spectacle lenses, and excellent results have been achieved in producing internally colored plastics of this type having good color stability, desirable light transmission characteristics, and excellent resistance to fading, even when exposed to direct sunlight for prolonged periods. In some cases, heating of the plastic bodies affects the color, causing it to change, but usually without appreciable fading. A wide range of colors is available through proper selection of the organo-metallic compound in view of the identity of the plastic material itself.

Organo-metallic compounds that have been found effective in the practice of the invention for coloring thermosetting plastics are organic compounds of the transition metals, particularly those that are not readily oxidizable. Their organic nature appears to render them soluble in the plastics, while the transition metal provides the color.

The transition elements as used hereinabove and hereinafter and which provide color include the transition elements set forth in the first, second, and third series plus the inner transition elements. These elements are set forth in the textbook "Inorganic Chemistry" by Therald Moeller (copyright 1952, fifth printing, 1956). The transition elements which do not produce color have been excluded and copper has been included since it has similar characteristics to the transition elements and is often referred to as a transition metal by those skilled in the art. A list of the transition elements includes titanium, vanadium, chromium, manganese, iron, cobalt, nickel, zirconium, niobium, molybdenum, technetium, ruthenium, rhodium, palladium, hafnium, tantalum, tungsten, rhenium, osmium, iridium, platinum, praeseodymium, neodymium, samarium, dysprosium, holmium, erbium, thulium and copper. Particular organic acid salts that have been successfully incorporated in various different plastic monomers or prepolymers for coloring them are:

Cobalt octoate
Cobalt naphthenate
Manganese resinate
Chromium octoate
Cupric oleate Werner complexes of organic acids with chromium such as:

Perfluorocaprylatochromic chloride
Methacrylatochromic chloride
Stereato chromic chloride Acetyl acetonate metal ion complexes such as:

Chromium acetyl acetonate
Cobalt acetyl acetonate

An aromatic hydrocarbon and a color producing transition element or:

Dicumene chromium

The first five salts of the above list are commercially available usually as mixtures with varying amounts of inert vehicles such as, for example, aliphatic alcohols or ketones, Stoddard solvent, mineral spirits, or high boiling point hydrocarbons. The vehicles facilitate handling of the salts and their solution in the plastics, and do not appreciably affect the properties of the plastics. In certain cases, it is preferable to use the colorant in essentially its pure form.

A wide range of compounds of the stated type is available. The particular compound to be used for coloring a particular plastic may be chosen on the basis of color and of the solubility of the compound in the plastic. The color saturation depends upon the amount of the selected compound incorporated in the plastic, and the upper limit that can be used is determined principally by the solubility of the compound in the monomer, or prepolymer system. In the event the selected compound is not soluble in the particular monomer, or prepolymer it is desired to color, the compound may be incorporated in a copolymerizable monomer in which it is soluble, and which is then introduced as a carrier.

EXAMPLES

*Example 1.*—A plastic body which may be used as an optical filter for transmission of green light may be made by mixing the following ingredients, weight basis:

| | Percent |
|---|---|
| CR-39 | 47.5 |
| Diallyl maleate | 47.5 |
| Cobalt acetyl acetonate | 5 |

The mixture is warmed to effect a thorough mixing and solution of all the ingredients. After cooling, a filter aid material such as diatomaceous earth is added and the mixture is filtered by passing it through an appropriate filter element such as is conventionally used in the production of plastic optical elements. About 3% by weight of isopropylpercarbonate (a polymerization initiator) is then added and the mixture is cast by placing it in a mold and curing it according to the following heat cycle:

16 hrs. at 72° F.
4 hrs. at 100° F.
1 hr. at 140° F.
1 hr. at 195° F.

The resulting cured body is clear and transparent and of a green color, with the color extending uniformly throughout the mass and thickness of the body. The optical transmission characteristics of a 2 mm. thick body so made are illustrated by the curve I shown in FIG. 1.

CR-39 is the trade name for diethylene glycol bis-allyl carbonate monomer.

*Example 2.*—A clear transparent plastic body of a yellowish-green color may be made of the following formulation:

| | | |
|---|---|---|
| Allyl methacrylate | g | 10.0 |
| Cobalt naphthenate (6% cobalt) | g | 1.0 |
| CR-39 | ml | 15 |

The cobalt naphthenate is added to the allyl methacrylate, in which it is soluble. The resulting solution is added slowly and with stirring to the CR-39. A filter aid is added and the solution filtered. About 3 wgt. percent of isopropylpercarbonate is then added and the material is cast and cured according to the following cycle:

16 hrs. at 100° F.
2 hrs. at 140° F.
3 hrs. at 160° F.

The optical transmission characteristics of a 2 mm. thick body so made are illustrated by the curve II shown in FIG. 1.

*Example 3.*—A clear, transparent plastic body having a green color may be made of the following formulation:

| | G. |
|---|---|
| Copper resinate | 0.4 |
| Allyl methacrylate | 9.6 |
| CR-39 | 90 |

The copper resinate is added to the allyl methacrylate, in which it is soluble, and which acts as a carrier to incorporate the copper resinate in the CR-39 composition. The solution is added to the CR-39 with stirring, and the resultant mixture is catalyzed by adding about 4 wgt. percent isopropyl percarbonate. The catalyzed mixture is poured into a mold and cured according to the following cycle:

18 hrs. at 110° F.
4 hrs. at 140° F.
1 hr. at 170° F.

The optical transmission characteristics of a 2 mm. thick body so made are illustrated by the curve III shown in FIG. 1.

*Example 4.*—A clear, transparent plastic body having a red-brown color may be made according to the following formulation:

| | G. |
|---|---|
| Manganese octoate (6%) | 1.0 |
| Allyl methacrylate | 9.0 |
| CR-39 | 90 |

The manganese octoate is added to the allyl methacrylate as in the preceding example, and the solution added with stirring to the CR-39. The mixture is catalyzed by adding about 4 wgt. percent isopropylpercarbonate and is then cured according to the same curing cycle as the material of Example 3. The optical transmission characteristics of this material are illustrated by the curve IV shown in FIG. 1.

*Example 5.*—A clear, transparent plastic body having a bluish-green color may be made according to the following formulation:

| | Percent |
|---|---|
| CR-39 | 90 |
| Allyl methacrylate | 10 |
| Cobalt naphthenate (6% cobalt) | 1.8 |
| Copper oleate (solid) | 0.55 |

The cobalt naphthenate and copper oleate are first dissolved in the allyl methacrylate. The resulting solution is added slowly and with stirring to the CR-39, filtered, catalyzed by adding about 4 wgt. percent isopropylpercarbonate, and then cast by placing in a mold and curing according to the following cycle:

16 hrs. at 42° C.
2 hrs. at 52° C.
1 hr. at 62° C.

Figure 2:
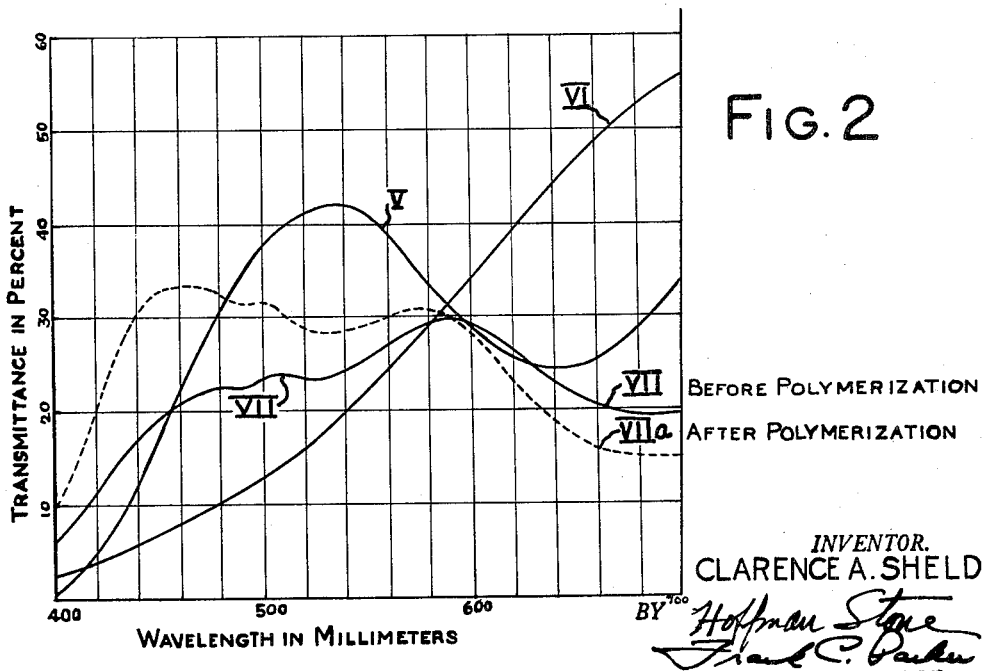
FIG. 2 is a chart illustrating the light transmission characteristics of four other different optical elements made according to the present invention.

The optical transmission characteristics of this material are illustrated by the curve V shown in FIG. 2.

*Example 6.*—A clear, transparent, brown colored plastic material may be made by dissolving about 0.15 g. of manganic acetyl acetonate in about 11.4 g. of diethylene glycol bis-allyl carbonate monomer, adding about 0.60 g. of isopropyl percarbonate, filtering the mixture and curing it in a mold by heating it to about 110° F. for 72 hrs., followed by about 3 hours at about 180° F. The optical transmission characteristics of the material so produced are illustrated by the curve VI shown in FIG. 2.

*Example 7.*—A clear, transparent optical element having a green color and light transmission characteristics presently regarded as highly desirable for sun glass lenses may be made according to the following recipe:

| | |
|---|---|
| Cobalt octoate (16% cobalt) | 0.63 wgt. percent. |
| Triallyl phosphate | 20.0 wgt. percent. |
| CR-39 | 79.37 wgt. percent. |
| Benzoyl peroxide | 4 wgt. percent based on the total wgt. of the other ingredients. |

The cobalt octoate is dissolved in the triallyl phosphate, and the benzoyl peroxide is dissolved in the CR-39. The two solutions are then mixed together, filtered, and then cast by placing the mixture in a mold in an oven at 140° F., and raising the oven temperature to about 185° F. over a period of about 4 hours.

Figure 3:
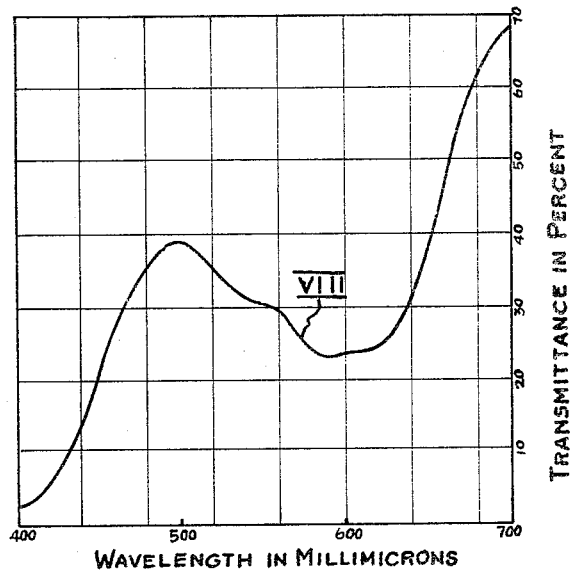
FIG. 3 is a chart showing the light transmission characteristics of a sun glass filter according to another embodiment of the invention; and, FIG. 4 is a chart showing the light transmission characteristics of three more colored plastics of the present invention, particularly showing the color additives effects achievable by mixing different plastics.

The resulting plastic body has a hardness of about 90D (Durometer rating) and its light transmission characteristics are as illustrated by the curve VIII in FIG. 3.

*Example 8.*—A green colored, clear, transparent optical element may be made as follows: 10 g. of a prepolymer of diallylbenzene phosphonate is treated with 15 g. of cobalt octoate (6% cobalt) to dissolve the cobalt octoate in the prepolymer. The mixture is heated to 110° C., held at that temperature for about 10 minutes, and then added to 19 g. of diethylene glycol bis-allyl carbonate, with stirring. The resulting mixture is catalyzed with about 3 wgt. percent benzoyl peroxide, and cured in a mold by heating at about 70° C. for 5 hours followed by heating at 80° C. for 15 hours. The optical transmission characteristics of the body so produced are as follows:

| $M\mu$ | Percent transmission |
| --- | --- |
| 400 | 0 |
| 420 | 2 |
| 440 | 3 |
| 460 | 7 |
| 480 | 16 |
| 500 | 21 |
| 520 | 22 |
| 540 | 21.5 |
| 560 | 20.0 |
| 580 | 17.5 |
| 600 | 16.5 |
| 620 | 17.5 |
| 640 | 22.0 |
| 660 | 30.0 |
| 680 | 40.0 |
| 700 | 50.0 |

Optical lenses made according to this example have shown no significant solarization effects over a one year period, thus demonstrating a high degree of color stability and resistance to radiation. The color of such lenses however, may be changed from green to a reddish green, and their overall transmission increased by heating them at about 220° F. for a period of several hours.

The color produced by any one of the organo-metallic compounds in any particular plastic must be determined empirically, since the same organo-metallic compound will often color different plastics differently. This effect may be utilized to advantage to produce plastic bodies having certain colors that are otherwise relatively difficult to achieve. For instance as illustrated by the following Example 9, the colors are additive, and a particular colorant that produces one color in one plastic and a different color in a second plastic may be used for coloring a copolymer of the two plastics. The resulting color of the copolymer is the sum of the colors produced by the colorant in the two plastics separately.

Figure 4:
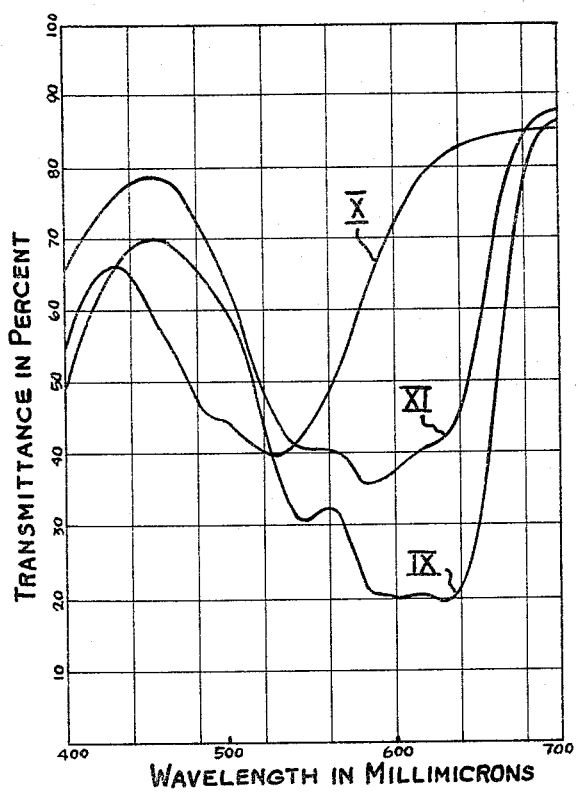

*Example 9.*—This example illustrates the additive effect of a colorant that produces one color in one plastic, and a second color in a different plastic. Cobalt octoate produces a blue coloration in diallyl benzene phosphonate, and a rose color in diallyldiglycollate. Transmission curves I and X are shown in FIG. 4 for two samples made as follows:

IX 0.4 g. of cobalt octoate (6% cobalt) was dissolved in 17.5 g. diallylbenzene phosphonate monomer. The solution was catalyzed with 4.5% benzoyl peroxide, cast in a mold, and cured for 16 hours at 75° C., followed by 8 hours at 90° C. The light transmission characteristics of the resulting blue colored body, 2 mm. thick, are shown by the curve IX in FIG. 4.

X 0.4 g. of cobalt octoate (6% cobalt) was dissolved in 17.5 g. diallyldiglycollate monomer. The solution was catalyzed and cured in exactly the same manner as the preceding specimen IX. The light transmission characteristics of the resulting rose colored body, 2 mm. thick, are shown by the curve X in FIG. 4.

A third specimen was made by mixing 10 g. of the diallylbenzene phosphonate solution (specimen IX) with 2.5 g. of the diallyldiglycollate solution (specimen X) and curing the resulting mixture in a mold after catalyzing it with 4.5% of benzoyl peroxide, in accordance with the curing cycle detailed in connection with specimen IX. The light transmission characteristics of the resulting lavender colored body are shown by the curve XI of FIG. 4. It will be seen that the coloring effect is additive, and that the coloration produced in the third specimen is the sum of the colorations produced by the cobalt octoate in the two specimens IX and X.

The following table may be of value as a general guide in the selection of coloring agents for a few different, difficulty colorable plastics.

*Table*

| Organo Metallic Compound | Polymer or Copolymer System | Color Produced |
| --- | --- | --- |
| Iron octoate | Allyl methacrylate and CR-39. | Yellow-brown. |
| Copper oleate | ----do---- | Light green. |
| Cobalt octoate | Diallyldiglycollate | Pink. |
| Copper resinate | Diallylmaleate and CR-39. | Green. |
| Copper oleate and cobalt naphthenate (Nuodex). | Diallyldiglycollate and polyester resin. | Gray. |
| Manganese acetyl acetonate. | CR-39 | Yellow-brown. |

Satisfactory results have been achieved in the practice of the invention in coloring other plastics than those used in the foregoing examples. For example, the following plastics have been colored by including selected organo-metallic compounds of the transition metals in their formulations: allyl methacrylate, diallyl phthalate, diallyl diglycollate, diethylene glycol dimethacrylate, diallyl maleate, diallyl phenyl phosphonate, and triallyl cyanurate, and triallyl phosphate.

Plastics colored according to the invention may also be surface dyed if desired to produce novelty effects, or to color them a shade that is not readily achievable by other means. In these cases, the dye bath used for the surface dying process may usually be of relatively simple composition, and, therefore, relatively easy to control for the production of uniform results.

What is claimed is:

1. Method of internally coloring a polymerized body, which comprises incorporating between 0.4 and 34% by weight of an organic compound of a color producing transition element into a polymerizable material selected from the group consisting of diethylene glycol bis-allyl carbonate
diallyl diglycollate
diallyl benzene phosphonate
allyl methacrylate
diallyl maleate
triallyl phosphate and
mixtures of at least two of these monomers and converting the mixture of said organic compound and said polymerizable material to a solid polymer.

2. Method of internally coloring a polymerized body, which comprises incorporating between 0.4 and 34% by weight of an organic compound of a color producing transition element into a polymerizable material selected from the group consisting of diethylene glycol bis-allyl carbonate
diallyl diglycollate
diallyl benzene phosphonate
allyl methacrylate
diallyl maleate
triallyl phosphate and
mixtures of at least two of these monomers said organic compound being selected from the group consisting of cobalt octoate, cobalt naphthenate, manganese resinate, chromium octoate, cupric oleate, Werner complexes of organic acids with chromium, acetyl acetonate metal ion complexes, dicumene chromium, and converting the mixture of said organic compound and said polymerizable material to a solid polymer.

3. Method of internally coloring a polymerized body, which comprises incorporating between 0.4 and 34% by weight of an organic compound of a color producing transition element into a polymerizable material selected from the group consisting of diethylene glycol bis-allyl carbonate
    diallyl diglycollate
    diallyl benzene phosphonate
    allyl methacrylate
    diallyl maleate and
    triallyl phosphate monomer said organic compound being soluble in the monomer employed, and converting the mixture of said organic compound and said monomer to a solid polymer in the presence of a strongly oxidizing catalyst.

4. Method of internally coloring a polymerized body, which comprises incorporating between 0.4 and 34% by weight of an organic compound of a color producing transition element into a mixture of at least two monomers selected from the group consisting of diethylene glycol bis-allyl carbonate
    diallyl diglycollate
    diallyl benzene phosphonate
    allyl methacrylate
    diallyl maleate and
    triallyl phosphate said organic compound being soluble in at least one of said monomers, and converting the mixture of said organic compound and said monomers to a solid polymer in the presence of a strongly oxidizing catalyst.

5. Method of internally coloring a polymerized body, which comprises incorporating between 0.4 and 34% by weight of an organic compound of a color producing transition element into a mixture of a prepolymer and a monomer selected from the group consisting of diethylene glycol bis-allyl carbonate
    diallyl diglycollate
    diallyl benzene phosphonate
    allyl methacrylate
    diallyl maleate and
    triallyl phosphate said prepolymer having been prepared from one of said monomers and said organic compound being soluble in said monomer, and converting the mixture of said organic compound, said prepolymer and said monomer to a solid polymer in the presence of an organic peroxide catalyst.

6. Method of internally coloring a polymerized body, which comprises incorporating between 0.4 and 34% by weight of an organic compound of a color producing transition element into a mixture of a prepolymer and at least two monomers selected from the group consisting of diethylene glycol bis-allyl carbonate
    diallyl diglycollate
    diallyl benzene phosphonate
    allyl methacrylate
    diallyl maleate and
    triallyl phosphate said prepolymer having been prepared from one of said monomers and said organic compound being soluble in at least one of the monomers, and converting the mixture of said organic compound, said prepolymer and said monomers to a solid polymer in the presence of an organic peroxide catalyst.

7. Method of internally coloring a polymerized body a selected color, which comprises dissolving 0.4–34% by weight of an organic compound of a color producing transition element in a mixture of two monomers selected from the group consisting of diethylene glycol bis-allyl carbonate
    diallyl diglycollate
    diallyl benzene phosphonate
    allyl methacrylate
    diallyl maleate and
    triallyl phosphate said organic compound being chosen as capable of imparting different respective colors to said monomers and said selected color being the sum of said different colors, and converting the solution of said organic compound in said monomers to a solid polymer by heating the solution in the presence of a strongly oxidizing catalyst.

8. Method of making a green transparent plastic body comprising mixing the following ingredients, weight basis:

|  | Percent |
|---|---|
| diethylene glycol bis-allyl carbonate | 47.5 |
| diallyl maleate | 47.5 |
| cobalt acetyl acetonate | 5 | catalyzing the mixture so made by the addition of a strongly oxidizing catalyst and polymerizing it to a final solid state by heating.

9. Method of making a clear transparent yellowish-green plastic body comprising mixing the following ingredients in the stated proportions:

| allyl methacrylate | g | 10.0 |
|---|---|---|
| cobalt naphthenate (6% cobalt) | g | 1.0 |
| diethylene glycol bis-allyl carbonate | ml | 15 | catalyzing the mixture so made by the addition of a strongly oxidizing catalyst and polymerizing it to a final solid state by heating.

10. Method of making a clear transparent green colored plastic body comprising mixing the following ingredients in the stated proportions:

|  | G. |
|---|---|
| copper resinate | 0.4 |
| allyl methacrylate | 9.6 |
| diethylene glycol bis-allyl carbonate | 90 | catalyzing the mixture so made by the addition of a strongly oxidizing catalyst and polymerizing it to a final solid state by heating.

11. Method of making a clear transparent body having a red-brown color comprising mixing the following ingredients in the stated proportions:

|  | G. |
|---|---|
| manganese octoate (6%) | 1.0 |
| allyl methacrylate | 9.0 |
| diethylene glycol bis-allyl carbonate | 90 | catalyzing the mixture so made by the addition of a strongly oxidizing catalyst and polymerizing it to a final solid state by heating.

12. Method of making a clear transparent plastic body having a bluish-green color comprising mixing the following ingredients, weight basis:

|  | Percent |
|---|---|
| diethylene glycol bis-allyl carbonate | 90 |
| allyl methacrylate | 10 |
| cobalt naphthenate (6% cobalt) | 1.8 |
| copper oleate (solid) | 0.55 | catalyzing the mixture so made by the addition of a strongly oxidizing catalyst and polymerizing it to a final solid state by heating.

13. Method of making a clear transparent brown colored plastic body comprising mixing the following ingredients in the stated proportions:

|  | G. |
|---|---|
| manganic acetyl acetonate | 0.15 |
| diethylene glycol bis-allyl carbonate | 11.4 |
| diisopropyl percarbonate | 0.60 | catalyzing the mixture so made by the addition of a strongly oxidizing catalyst and polymerizing it to a final solid state by heating.

14. Method of making a clear transparent green colored plastic body comprising mixing the following ingredients, weight basis:

|  | Percent |
|---|---|
| cobalt octoate (16% cobalt) | 0.63 |
| triallyl phosphate | 20.0 |
| diethylene glycol bis-allyl carbonate | 79.37 | catalyzing the mixture so made by the addition of a strongly oxidizing catalyst and polymerizing it to a final solid state by heating.

15. Method of making a clear transparent green colored plastic body comprising mixing the following ingredients in the stated proportions:

|  | G. |
|---|---|
| diallyl benzene phosphonate | 10 |
| cobalt octoate (6% cobalt) | 15 |
| diethylene glycol bis-allyl carbonate | 19 | catalyzing the mixture so made by the addition of a strongly oxidizing catalyst and polymerizing it to a final solid state by heating.

16. Method of making a plastic body comprising mixing the following ingredients in the stated proportions:

| cobalt octoate (6% cobalt) | g | 0.4 |
|---|---|---|
| diallyl benzene phosphonate | g | 17.5 |
| benzoyl peroxide, percent | | 4.5 | to make a first solution, mixing the following ingredients in the stated proportions:

|  | G. |
|---|---|
| cobalt octoate (6% cobalt) | 0.4 |
| diallyl diglycollate | 17.5 | to make a second solution, mixing said first and second solutions in the proportion of about 4 to 1 by weight to make a third solution, catalyzing said third solution by the addition of a strongly oxidizing catalyst and polymerizing it to a final solid state by heating.

References Cited by the Examiner
UNITED STATES PATENTS

| 1,587,274 | 6/26 | Bebbe et al. | |
| 2,273,891 | 2/42 | Pollack et al. | 260—89.7 |
| 2,384,115 | 9/45 | Muskat et al. | 260—77.5 |
| 2,409,633 | 10/46 | Kropa | 260—77.5 |
| 2,456,265 | 12/48 | Frelich | 260—23.7 X |
| 2,537,375 | 1/51 | Simons et al. | 260—45.4 |
| 2,538,810 | 1/51 | Toy | 260—77.5 |
| 2,555,775 | 6/51 | Adelson et al. | 260—23 |
| 2,642,410 | 6/53 | Hoppens | 260—78.5 |
| 2,934,512 | 4/60 | Godshalk | 260—23 |
| 2,986,547 | 5/61 | Jefts et al. | 260—41.5 X |
| 3,001,967 | 9/61 | Willersinn | 260—45.4 |
| 3,009,890 | 11/61 | Dalton | 260—23 |
| 3,023,195 | 2/62 | Martin et al. | 260—41.5 X |

FOREIGN PATENTS

| 532,412 | 10/56 | Canada. |
| 800,142 | 8/58 | Great Britain. |

OTHER REFERENCES

Hackh's Chemical Dictionary, Third Edition, Blakiston Company, Philadelphia, 1944 (pages 599, 863 and 864 relied on).

LEON J. BERCOVITZ, *Primary Examiner.*

ALPHONSO D. SULLIVAN, MILTON STERMAN,
*Examiners.*